(12) United States Patent
Yee et al.

(10) Patent No.: US 12,093,764 B2
(45) Date of Patent: Sep. 17, 2024

(54) TRANSACTION CARD WITH TACTILE ELEMENTS

(71) Applicant: Capital One Services, LLC, McLean, VA (US)

(72) Inventors: Bryant Yee, Silver Spring, MD (US); Tyler Maiman, Melville, NY (US); Cruz Vargas, Ocean Springs, MS (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/154,605

(22) Filed: Jan. 13, 2023

(65) Prior Publication Data

US 2024/0242051 A1    Jul. 18, 2024

(51) Int. Cl.
*G06K 19/063* (2006.01)
*G06K 19/04* (2006.01)

(52) U.S. Cl.
CPC ......... *G06K 19/063* (2013.01); *G06K 19/044* (2013.01)

(58) Field of Classification Search
CPC ..... G06K 19/063; G06K 19/044; G06K 19/04
See application file for complete search history.

(56) References Cited

U.S. PATENT DOCUMENTS

| | | | | |
|---|---|---|---|---|
| 3,838,252 A * | 9/1974 | Hynes | ................ | B42D 25/369 360/2 |
| 3,874,586 A * | 4/1975 | Foote | ................ | G06K 7/08 360/2 |
| 3,972,138 A * | 8/1976 | Armbruster | ............ | G06K 19/10 283/82 |
| 4,058,839 A * | 11/1977 | Darjany | ................ | B42D 25/00 360/2 |
| 4,684,795 A * | 8/1987 | Colgate, Jr. | ............ | G06K 19/10 235/487 |
| 4,754,418 A * | 6/1988 | Hara | ................ | G06F 15/0216 361/679.56 |
| 5,255,941 A * | 10/1993 | Solomon | ................ | B42D 25/20 283/82 |
| 5,291,318 A * | 3/1994 | Genovese | ................ | G02B 5/32 359/205.1 |
| 5,383,687 A * | 1/1995 | Suess | ................ | B42D 25/425 428/209 |
| 6,138,917 A * | 10/2000 | Chapin, Jr. | ........ | G06K 19/06196 235/487 |
| 6,180,427 B1 * | 1/2001 | Silverbrook | ............ | B41J 2/1645 347/56 |
| 6,390,372 B1 * | 5/2002 | Waters | ................ | G06K 19/077 235/487 |
| 6,758,936 B1 * | 7/2004 | Kiekhaefer | ............ | B42D 25/00 156/289 |
| 7,793,834 B2 | 9/2010 | Hachey et al. | | |
| 8,910,867 B2 * | 12/2014 | Philips | ................ | G01N 21/88 235/492 |
| 9,390,363 B1 * | 7/2016 | Herslow | ................ | B32B 27/304 |
| 10,360,489 B1 * | 7/2019 | Herrington | ........ | G06K 19/0723 |
| 10,513,081 B1 * | 12/2019 | Vittimberga | ........ | B29C 64/153 |
| 10,817,868 B1 * | 10/2020 | Marsch | ................ | G06Q 20/352 |
| 11,030,509 B1 * | 6/2021 | Johnson | ........ | G06K 19/06196 |

(Continued)

*Primary Examiner* — Daniel I Walsh
(74) *Attorney, Agent, or Firm* — Harrity & Harrity, LLP

(57) ABSTRACT

In some implementations, a transaction card may include a card body, a magnetic stripe connected to the card body at a magnetic stripe region of the card body, and a tactile element at the magnetic stripe region of the card body.

20 Claims, 8 Drawing Sheets

(56) References Cited

U.S. PATENT DOCUMENTS

| | | | |
|---|---|---|---|
| 11,392,189 B1* | 7/2022 | Scruggs | H01Q 7/00 |
| 2002/0096569 A1* | 7/2002 | Boutaghou | G06K 19/06196 |
| | | | 235/493 |
| 2003/0178487 A1* | 9/2003 | Rogers | G07F 9/002 |
| | | | 235/454 |
| 2004/0056102 A1* | 3/2004 | Cheung | G06K 19/04 |
| 2005/0006472 A1* | 1/2005 | Verschuur | G06K 1/121 |
| | | | 235/492 |
| 2005/0179253 A1* | 8/2005 | Rivera | B41M 7/0081 |
| | | | 283/81 |
| 2006/0255155 A1* | 11/2006 | Cranston | B42D 25/455 |
| | | | 235/488 |
| 2007/0072088 A1* | 3/2007 | Yumoto | G11B 7/0065 |
| 2008/0149713 A1* | 6/2008 | Brundage | G07F 7/082 |
| | | | 235/435 |
| 2008/0208687 A1* | 8/2008 | McNeill | G06Q 30/02 |
| | | | 705/14.49 |
| 2008/0251581 A1* | 10/2008 | Faenza | B42D 25/382 |
| | | | 235/487 |
| 2009/0011192 A1* | 1/2009 | Tomczyk | B29D 11/00278 |
| | | | 156/219 |
| 2009/0101721 A1* | 4/2009 | Hawthorne | G06K 19/07 |
| | | | 235/492 |
| 2009/0127344 A1* | 5/2009 | Dostmann | B42D 25/324 |
| | | | 235/488 |
| 2009/0200385 A1* | 8/2009 | Hachey | B42D 25/00 |
| | | | 235/494 |
| 2009/0235037 A1* | 9/2009 | Mounier | G07F 7/1008 |
| | | | 711/E12.001 |
| 2009/0239034 A1* | 9/2009 | Lamb | B42D 25/45 |
| | | | 427/256 |
| 2009/0251749 A1* | 10/2009 | O'Boyle | B32B 15/00 |
| | | | 359/2 |
| 2009/0315321 A1* | 12/2009 | Michieli | B42D 25/324 |
| | | | 283/111 |
| 2010/0025475 A1* | 2/2010 | Webb | B42D 25/378 |
| | | | 235/491 |
| 2010/0264226 A1* | 10/2010 | Loughran | B42D 25/369 |
| | | | 235/487 |
| 2010/0264227 A1* | 10/2010 | Joyce | G06K 19/077 |
| | | | 235/487 |
| 2010/0271174 A1* | 10/2010 | Kaminska | B42D 25/29 |
| | | | 235/491 |
| 2011/0084148 A1* | 4/2011 | Ricketts | B42D 25/435 |
| | | | 235/494 |
| 2013/0171423 A1* | 7/2013 | Cruikshank | B41J 2/015 |
| | | | 347/20 |
| 2013/0241190 A1* | 9/2013 | Menz | B42D 25/47 |
| | | | 283/75 |
| 2013/0258477 A1* | 10/2013 | Lok | G02B 27/4233 |
| | | | 359/573 |
| 2014/0061976 A1* | 3/2014 | Doersam | G03H 1/028 |
| | | | 264/479 |
| 2014/0259838 A1* | 9/2014 | Tattersall | B32B 27/08 |
| | | | 428/81 |
| 2015/0298484 A1* | 10/2015 | Motoi | B41J 2/47 |
| | | | 347/225 |
| 2018/0194144 A1* | 7/2018 | Beech | B41M 7/0081 |
| 2018/0197433 A1* | 7/2018 | Tavares | G09B 21/007 |
| 2019/0070887 A1* | 3/2019 | Peters | G06K 19/06009 |
| 2019/0134986 A1* | 5/2019 | Johnson | B41J 2/17523 |
| 2020/0125911 A1* | 4/2020 | Scruggs | G06Q 20/341 |
| 2021/0110227 A1* | 4/2021 | Harmon | G09B 21/001 |
| 2021/0117744 A1* | 4/2021 | Finn | G06K 19/07769 |
| 2021/0138795 A1* | 5/2021 | Sarkinen | B41J 2/185 |
| 2021/0174159 A1* | 6/2021 | Finn | G06K 19/0726 |
| 2021/0271950 A1* | 9/2021 | Nam | G06K 19/07749 |
| 2022/0169187 A1* | 6/2022 | Paper | G02B 1/14 |
| 2023/0065729 A1* | 3/2023 | Yee | G06K 19/06187 |

* cited by examiner

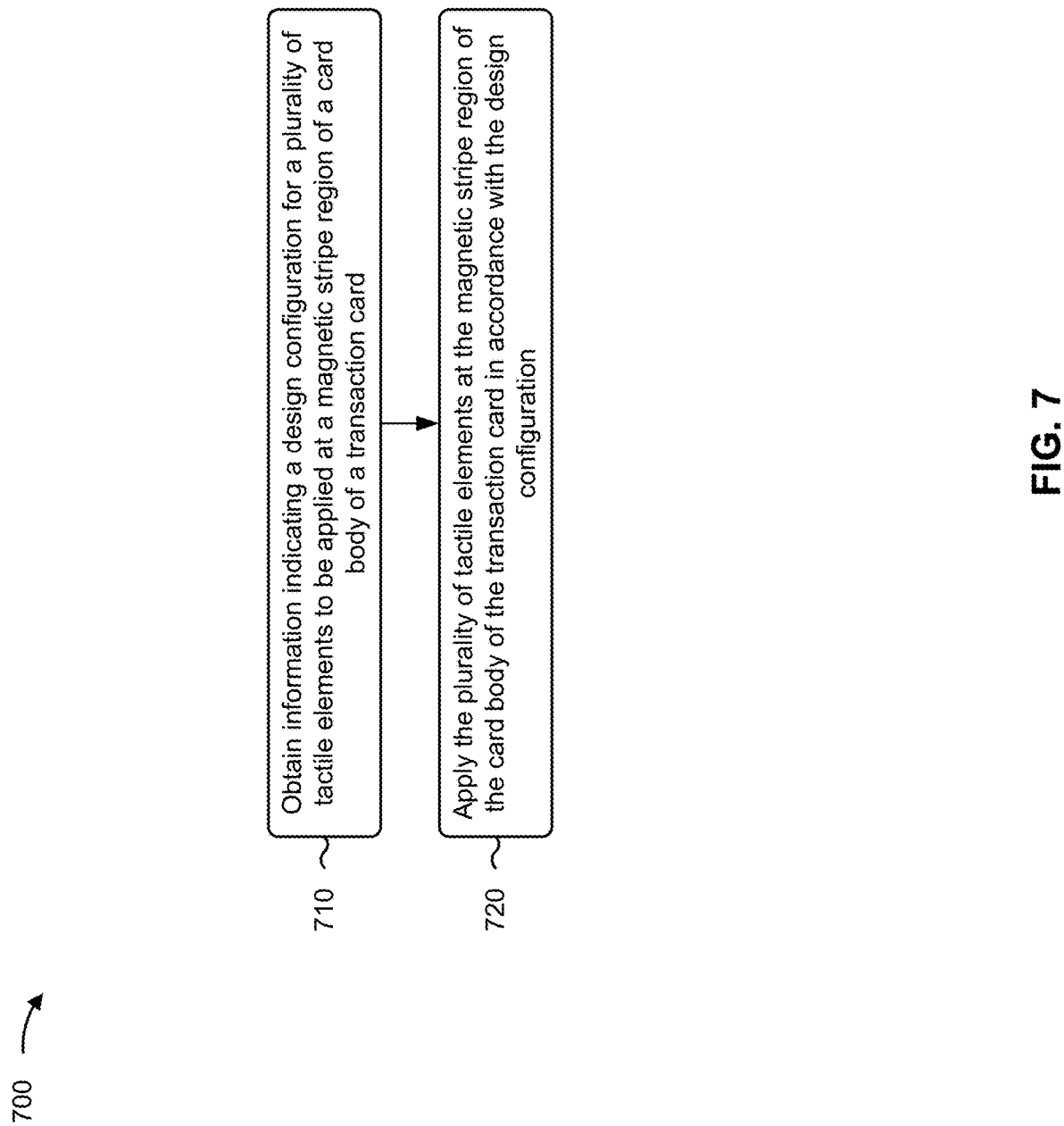

TRANSACTION CARD WITH TACTILE ELEMENTS

BACKGROUND

Transactions often involve use of a transaction card (e.g., a credit card, a debit card, a gift card, an automated teller machine (ATM) card, a rewards card, an access card, or client loyalty card, among other examples) to pay for products or services at a transaction terminal (e.g., a point of sale (POS) terminal) of an individual or business engaged in the sale of goods or services (e.g., via a swiping of the transaction card at a card reader, insertion of the transaction card into a chip reader, or wireless transmission of transaction card data to a wireless receiver). In some instances, a magnetic stripe, an integrated circuit chip, a radio frequency (RF) antenna, and/or a radio frequency identification (RFID) tag may be included in a transaction card to provide information associated with the transaction card (e.g., an account identifier, account information, a payment token, or the like).

SUMMARY

In some implementations, a transaction card includes a card body, a magnetic stripe connected to the card body, and a plurality of tactile elements overlaid on the magnetic stripe and raised relative to a surface of the magnetic stripe. The plurality of tactile elements may be non-alphanumeric. A design configuration of the plurality of tactile elements may indicate an attribute of the transaction card.

In some implementations, a transaction card includes a card body, a magnetic stripe connected to the card body at a magnetic stripe region of the card body, and a tactile element at the magnetic stripe region of the card body.

In some implementations, a method includes obtaining information indicating a design configuration for a plurality of tactile elements to be applied at a magnetic stripe region of a card body of a transaction card, and applying the plurality of tactile elements at the magnetic stripe region of the card body of the transaction card in accordance with the design configuration.

BRIEF DESCRIPTION OF THE DRAWINGS

FIG. 7 is a flowchart of an example process associated with manufacturing a transaction card with tactile elements, in accordance with some embodiments of the present disclosure.

DETAILED DESCRIPTION

Figure 1A:
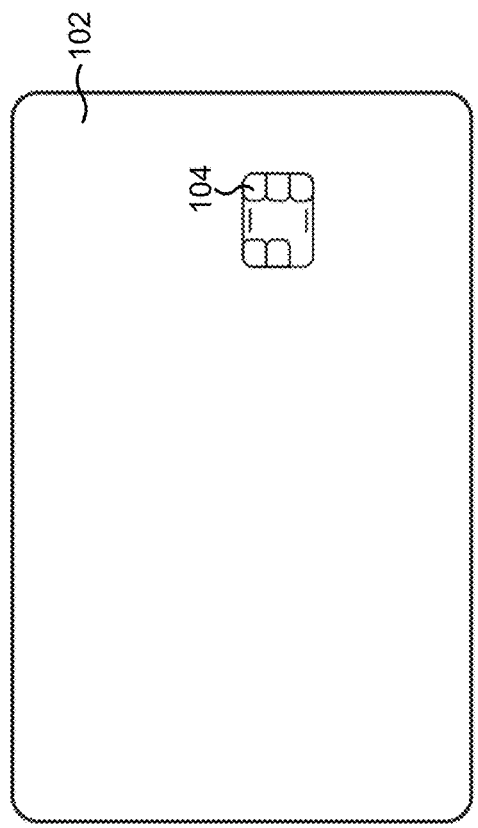
FIGS. 1A-1C show an example transaction card, in accordance with some embodiments of the present disclosure.

The following detailed description of example implementations refers to the accompanying drawings. The same reference numbers in different drawings may identify the same or similar elements.

As described above, a transaction card may include a magnetic stripe that can be used to provide information associated with the transaction card. For example, a magnetic stripe reader may obtain the information when the transaction card is swiped at the magnetic stripe reader. Generally, the transaction card may be configured for swiping at the magnetic stripe reader in a single orientation, and the magnetic stripe reader may be unable to obtain the information when the transaction card is swiped at the magnetic stripe reader using an improper orientation of the transaction card. Because there are multiple orientations at which the transaction card can be swiped at the magnetic stripe reader, improper orientations are commonly used. As a result, the magnetic stripe reader may expend significant computing resources (e.g., processor resources and/or memory resources), power resources, and/or network resources attempting to read the information, execute a transaction, and/or transmit transaction details when the transaction card is in an improper orientation. Moreover, an execution time of the transaction may be prolonged when one or more improper orientations of the transaction card are attempted. Similar issues may exist for tapping or inserting a transaction card with an integrated circuit (IC) chip at a chip reader.

For individuals with visual impairments and/or in low-light environments, it may be particularly difficult to identify a correct orientation of a transaction card. Moreover, numerous transaction cards may be stored in a storage article (e.g., a wallet, a billfold, a purse, or the like). Thus, for individuals with visual impairments and/or in low-light environments, it may be difficult to select a particular transaction card from multiple transaction cards.

Some implementations described herein provide a transaction card that includes tactile elements overlaid on a magnetic stripe of the transaction card and raised relative to a surface of the magnetic stripe. The tactile elements may have a particular design configuration that indicates an attribute of the transaction card, such as a type of the transaction card (e.g., a debit card, a credit card, a rewards card, or the like) and/or an issuer of the transaction card. Thus, multiple transaction cards may have respective tactile elements in different design configurations, thereby facilitating differentiation between the multiple transaction cards using the tactile elements. Moreover, placement of the tactile elements on the magnetic stripe facilitates identification of the location of the magnetic stripe, as well as identification of the location of an IC chip of the transaction card relative to the location of the magnetic stripe. Thus, the tactile elements facilitate identification of a correct orientation for the transaction card for swiping at a magnetic stripe reader and/or for tapping or inserting at a chip reader. In this way, computing resources, power resources, and/or network resources, that may have otherwise been expended by a magnetic stripe reader and/or a chip reader attempting to process a transaction card in an improper orientation, may be conserved. Moreover, the transaction card may enable faster execution time of transactions, thereby improving an efficiency and a throughput of the magnetic stripe reader and/or the chip reader.

Figure 1B:
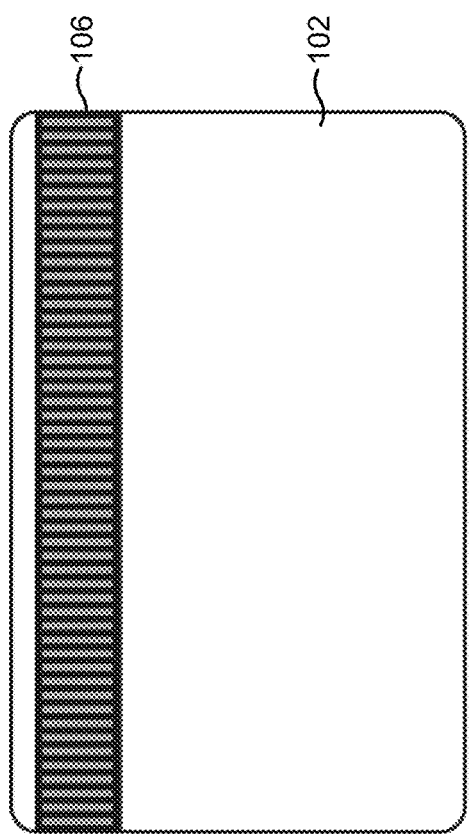
Figure 1C:
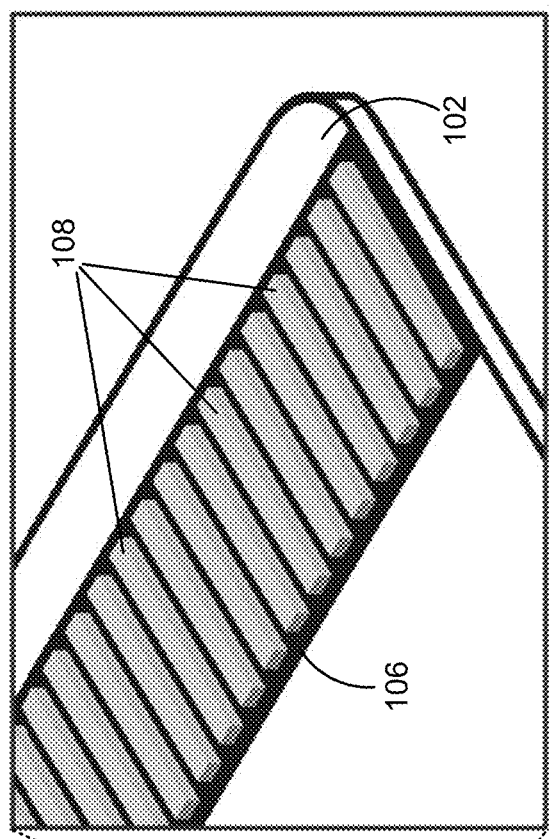
Figure 1C:
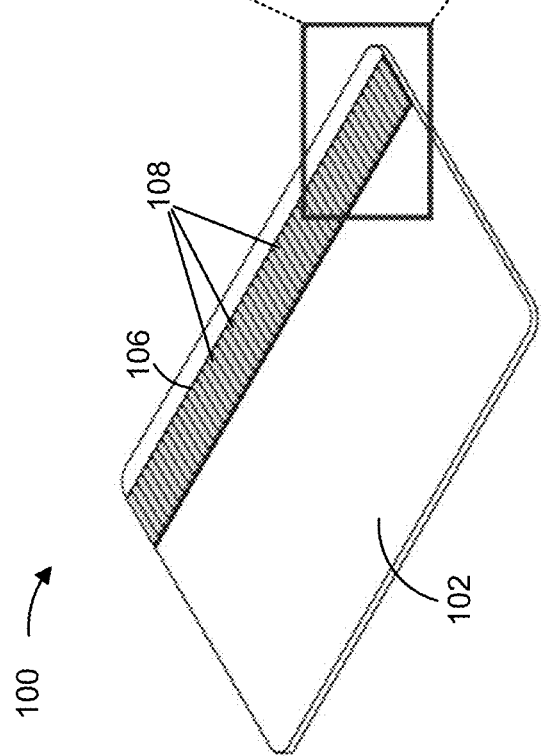
Figure 2:
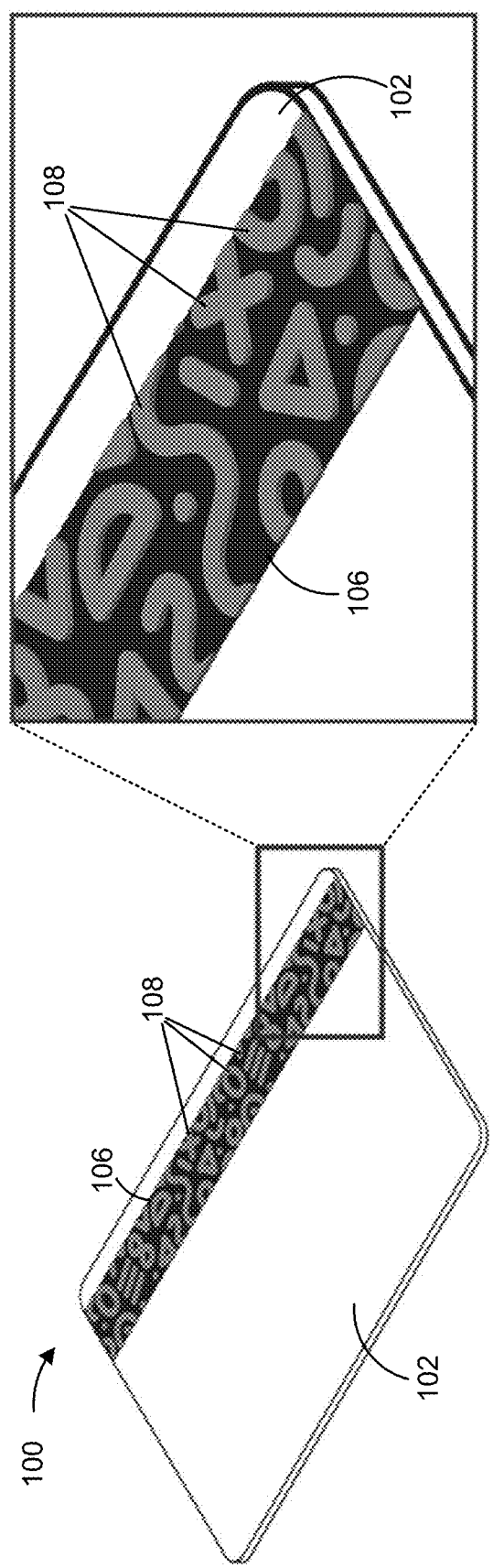
FIGS. 2-5 show the example transaction card with alternative design configurations of tactile elements, in accordance with some embodiments of the present disclosure.
Figure 3:
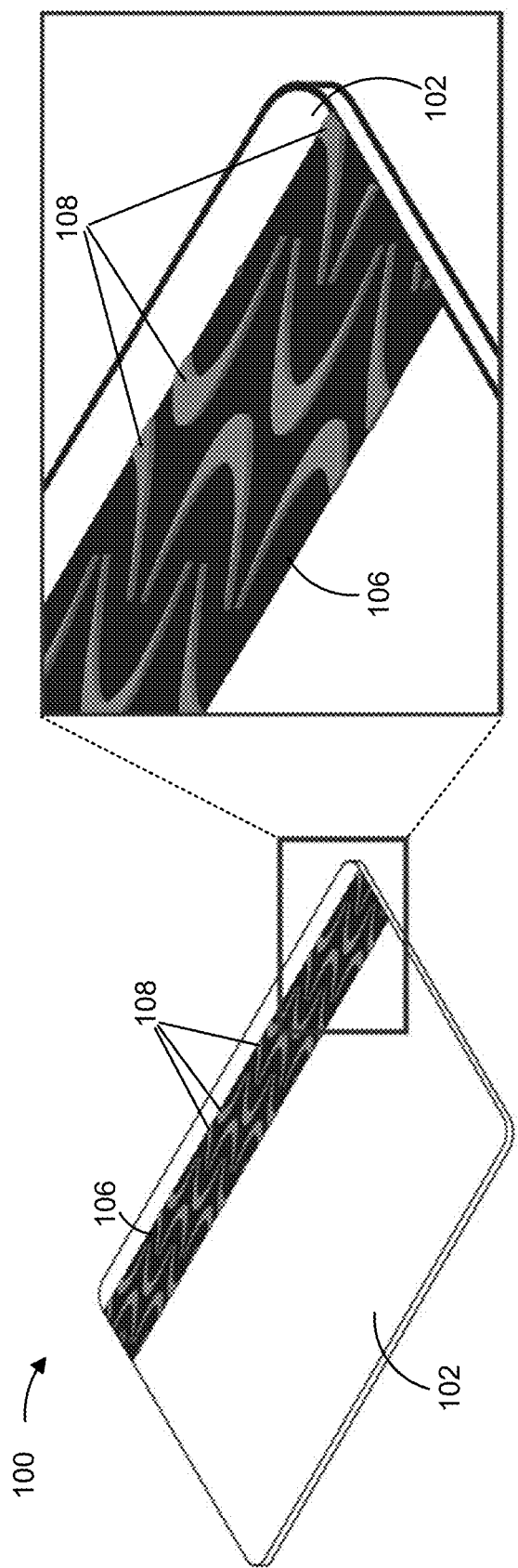
Figure 4:
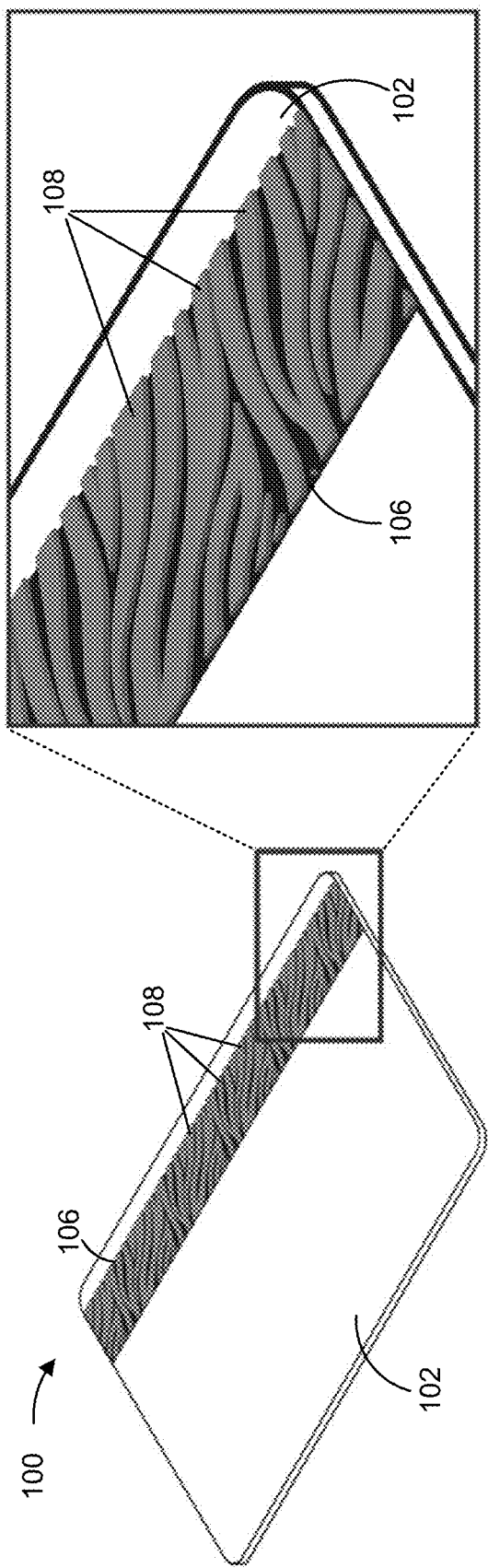
Figure 5:
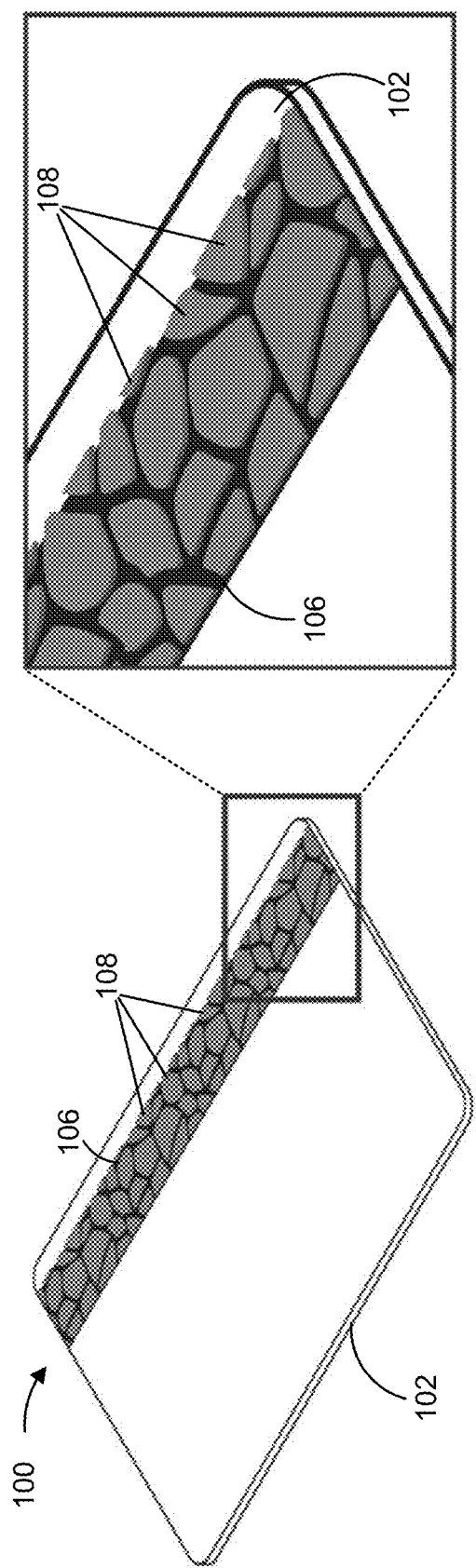

FIGS. 1A-1C show an example transaction card 100. The transaction card 100 may include a credit card, a debit card, a gift card, an ATM card, a rewards card, an access card, or a client loyalty card, among other examples.

The transaction card 100 may include a card body 102. The card body 102 may have a length (e.g., along the x-axis shown) and a height (e.g., along the y-axis shown). In some implementations, the length of the card body 102 may be greater than the height of the card body 102 (e.g., the card body 102 may be in the shape of a rectangle). For example, the length of the card body 102 may be about (e.g., ±5%) 85 millimeters (mm) (e.g., 85.6 mm) and the height of the card body 102 may be about 54 mm (e.g., 53.98 mm). The card body 102 may include (e.g., may be composed of) a resilient material (e.g., a material that returns to an equilibrium position following deformation). For example, the card body 102 may include a plastic (e.g., polyvinyl chloride (PVC)) and/or a metal (e.g., steel). The card body 102 may include a thin substrate, and may have a first surface (e.g., a front surface), as shown in FIG. 1A, and a second surface (e.g., a back surface), as shown in FIG. 1B, opposite the first surface.

In some implementations, the transaction card 100 may include an IC chip 104 (e.g., a EUROPAY®, MASTER-CARD®, VISAR® (EMV) chip). The IC chip 104 may be embedded in the card body 102 and accessible from the first surface of the card body 102 via a set of electrical contacts. The transaction card 100 may include a magnetic stripe 106 (also referred to as a "magnetic strip"). The magnetic stripe 106 may be connected to (e.g., disposed on or embedded in) the second surface of the card body 102 at a magnetic stripe region of the card body 102 (e.g., a region of the card body 102 that is occupied by the magnetic stripe 106). The magnetic stripe 106 may be accessible from the second surface of the card body 102. For example, the magnetic stripe 106 may be readable (e.g., by a magnetic stripe reader) from the second surface of the card body 102. The IC chip 104 and the magnetic stripe 106 may store and/or encode information associated with the transaction card 100. For example, the information may indicate an account associated with the transaction card 100. In some implementations, the transaction card 100 may include information associated with the account printed, embossed, or the like, on the first surface and/or on the second surface of the card body 102. For example, the information may indicate a name of an account holder of the account, an account identifier (e.g., a credit card number) of the account, a name of an issuer (e.g., a financial institution) of the account, a type of the transaction card 100, an expiration date of the account, and/or a security code for the transaction card 100, among other examples.

As shown in FIG. 1C, the transaction card 100 may include one or more tactile elements 108 (e.g., a plurality of tactile elements) in the magnetic stripe region of the card body 102. For example, the tactile elements 108 may be overlaid on the magnetic stripe 106. Overlaying of the tactile elements 108 on the magnetic stripe 106 may not interfere with reading of the magnetic stripe 106 by a magnetic stripe reader.

The tactile elements 108 may be raised relative to a surface of the magnetic stripe 106 (e.g., the tactile elements 108 may project from the surface of the magnetic stripe 106). For example, the tactile elements 108 may be raised relative to the surface of the magnetic stripe 106 by about 1 mm or less. The tactile elements 108 may include multiple tactile elements 108 that are non-contiguous (e.g., not touching or abutting) with each other. For example, the tactile elements 108 may include at least a first tactile element 108, raised relative to the surface of the magnetic stripe 106, and a second tactile element 108, raised relative to the surface of the magnetic stripe 106, and the first tactile element 108 may be non-contiguous with the second tactile element 108.

The tactile elements 108 may be in a particular design configuration. For example, as shown in FIG. 1C, the tactile elements 108 may include a series of evenly spaced rectangular bars. The design configuration of the tactile elements 108 may indicate an attribute of the transaction card 100. For example, the attribute may be an issuer of the transaction card 100 and/or a type of the transaction card 100. In other words, the design configuration of the tactile elements 108 may differentiate the transaction card 100 from another transaction card that employs a different design configuration of tactile elements, such as one of the design configurations shown in FIGS. 2-5.

In some implementations, the tactile elements 108 may be non-alphanumeric (e.g., the tactile elements 108 may not convey alphanumeric information, such as words, numbers, or other text, though in some examples the tactile elements 108 may have shapes that incidentally correspond to alphanumeric characters, such as "X" or "O"). In some implementations, one or more tactile elements 108 may be alphanumeric, such as Braille characters. The tactile elements 108 may include shapes, characters, grooves, and/or stripes, among other examples. The tactile elements 108 may be arranged arbitrarily, in a pattern, or in a manner that depicts an image.

In some implementations, the tactile elements 108 may be evenly spaced from each other. In some implementations, the spacing between first adjacent tactile elements 108 may be different from the spacing between second adjacent tactile elements 108. In some implementations, the tactile elements 108 may be uniformly sized and shaped. In other words, each of the tactile elements 108 may have the same size and shape. In some implementations, a first tactile element 108 may have a different size and/or a different shape from a second tactile element 108. In some implementations, the tactile elements 108 may each be raised the same distance from the surface of the magnetic stripe 106. In some implementations, a first tactile element 108 may be raised a first distance from the surface of the magnetic stripe 106, and a second tactile element 108 may be raised a second distance from the surface of the magnetic stripe 106 that is different from the first distance.

The tactile elements 108 may include (e.g., may be composed of) a non-ferrous material. In this way, the tactile elements 108 may not interfere with reading of the magnetic stripe 106. In some implementations, the tactile elements 108 may include (e.g., may be composed of) dual-state ink that is ultraviolet (UV) light-curable. For example, the ink may be applied to the magnetic stripe 106 in a liquid state, and the ink may harden to a solid state upon exposure to UV light. In some implementations, the tactile elements 108 may include (e.g., may be composed of) additively-layered material (e.g., a plastic material). For example, the tactile elements 108 may be layered onto the magnetic stripe 106 using additive printing. In some implementations, the tactile elements 108 may include embossing. For example, the tactile elements 108 may be embossed on the card body 102, and the magnetic stripe 106 may be overlaid on the embossed tactile elements 108. In some implementations, the transaction card 100 may include an overlay layer disposed on the magnetic stripe 106, and the overlay layer may include the tactile elements 108. The overlay layer may be affixed to the magnetic stripe 106 by an adhesive. The tactile elements 108 on the overlay layer may include dual-state ink that is UV-light curable, additively-layered material, or embossing, in a similar manner as described above.

By arranging the tactile elements 108 in the magnetic stripe region of the transaction card 100, the tactile elements 108 facilitate identification of an orientation of the transaction card 100 and identification of a location of the magnetic stripe 106 and/or the IC chip 104 (e.g., relative to the location of the magnetic stripe 106). In this way, a correct orientation of the transaction card 100 for use at a magnetic stripe reader or a chip reader may be easily identified.

As indicated above, FIGS. 1A-1C are provided as an example. Other examples may differ from what is described with regard to FIGS. 1A-1C.

FIGS. 2-5 show the example transaction card 100 with alternative design configurations of the tactile elements 108. Each design configuration may indicate an attribute of a transaction card, as described above. For example, the design configuration of the tactile elements 108 shown in FIG. 2 may indicate a first issuer and/or a first type of transaction card, the design configuration of the tactile elements 108 shown in FIG. 3 may indicate a second issuer and/or a second type of transaction card, the design configuration of the tactile elements 108 shown in FIG. 4 may indicate a third issuer and/or a third type of transaction card, and the design configuration of the tactile elements 108 shown in FIG. 5 may indicate a fourth issuer and/or a fourth type of transaction card. In this way, the tactile elements 108 facilitate differentiation between multiple different transaction cards.

As indicated above, FIGS. 2-5 are provided as examples. Other examples may differ from what is described with regard to FIGS. 2-5.

Figure 6:
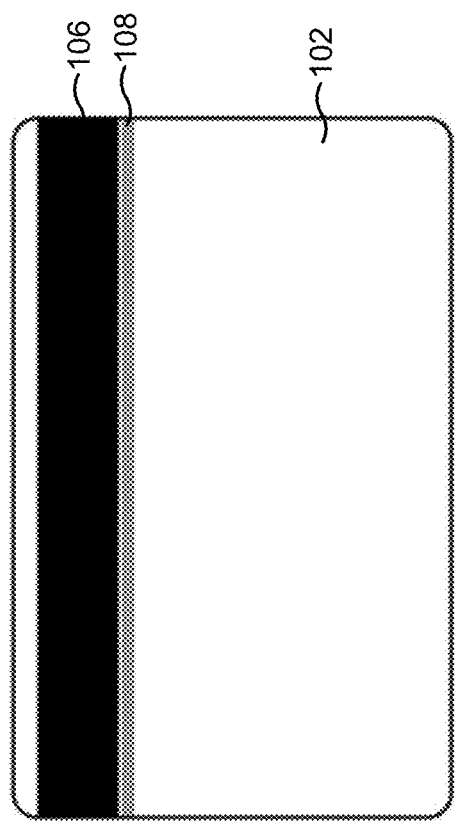
FIG. 6 shows the example transaction card with an alternative design configuration of a tactile element, in accordance with some embodiments of the present disclosure.

FIG. 6 shows the example transaction card 100 with an alternative design configuration of a tactile element 108. As shown, the tactile element 108 (e.g., shown in a fin-shaped configuration) may border at least one edge of the magnetic stripe 106. For example, the magnetic stripe region, in which tactile elements 108 are located, as described above, may include an immediately-adjacent region to the magnetic stripe 106. Thus, the tactile element 108 may contact or nearly contact (e.g., be within 2 mm of) the magnetic stripe 106, without overlapping with the magnetic stripe 106. The tactile element 108 may extend the length of the card body 102 or a portion thereof. In some implementations, multiple tactile elements 108 may border at least one edge of the magnetic stripe 106.

As indicated above, FIG. 6 is provided as an example. Other examples may differ from what is described with regard to FIG. 6.

FIG. 7 is a flowchart of an example process 700 associated with manufacturing a transaction card with tactile elements. In some implementations, one or more process blocks of FIG. 7 may be performed by transaction card manufacturing equipment.

As shown in FIG. 7, process 700 may include obtaining information indicating a design configuration for a plurality of tactile elements to be applied at a magnetic stripe region of a card body of a transaction card (block 710). As further shown in FIG. 7, process 700 may include applying the plurality of tactile elements at the magnetic stripe region of the card body of the transaction card in accordance with the design configuration (block 720).

In some implementations, applying the plurality of tactile elements may include depositing dual-state ink that is UV light-curable on a magnetic stripe in the magnetic stripe region, and exposing the dual-state ink to UV light. For example, the tactile elements may be applied using a UV printing technique (e.g., variable data UV printing). In some implementations, applying the plurality of tactile elements may include forming the plurality of tactile elements on a magnetic stripe in the magnetic stripe region using additive printing. In some implementations, applying the plurality of tactile elements may include applying an overlay layer on a magnetic stripe in the magnetic stripe region, and the overlay layer includes the tactile elements. For example, the overlay layer may include an adhesive backing that adheres the overlay layer to the magnetic stripe. In some implementations, the plurality of tactile elements are applied to the magnetic stripe region of the card body to overlay a magnetic stripe in the magnetic stripe region.

In some implementations, process 700 may include receiving a digital image that depicts a two-dimensional (2D) representation of the design configuration for the plurality of tactile elements. Here, obtaining the information indicating the design configuration for the plurality of tactile elements, may include generating the information indicating the design configuration for the plurality of tactile elements, and the information may identify a three-dimensional (3D) representation (e.g., a 3D model) of the design configuration for the plurality of tactile elements based on the 2D representation of the design configuration for the plurality of tactile elements. For example, the 2D representation of the design configuration may be converted to a 3D representation using a 2D-to-3D conversion application. In some implementations, the digital image may be received from a user device of a user that is designing a customized transaction card.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transaction card, comprising:
    a card body;
    a magnetic stripe connected to an outermost surface the card body; and
    a plurality of tactile elements overlaid directly on an outermost surface of the magnetic stripe and raised relative to the outermost surface of the card body and the outermost surface of the magnetic stripe,
        wherein the plurality of tactile elements comprise dual-state ink that is ultraviolet light-curable,
        wherein the plurality of tactile elements are non-alphanumeric, and
        wherein a design configuration of the plurality of tactile elements indicates an attribute of the transaction card.

2. The transaction card of claim 1, wherein the attribute of the transaction card is at least one of an issuer of the transaction card or a type of the transaction card.

3. The transaction card of claim 1, wherein the plurality of tactile elements comprise:
    a first tactile element that is raised relative to the outermost surface of the card body and the outermost surface of the magnetic stripe, and
    a second tactile element that is raised relative to the outermost surface of the card body and the outermost surface of the magnetic stripe,
        wherein the first tactile element is non-contiguous with the second tactile element.

4. The transaction card of claim 1, wherein the plurality of tactile elements are raised relative to the outermost surface of the magnetic stripe by 1 millimeter or less.

5. The transaction card of claim 1, wherein the plurality of tactile elements comprise additively-layered material.

6. The transaction card of claim 1, further comprising:
    an overlay layer disposed on the magnetic stripe,
        wherein the overlay layer comprises the plurality of tactile elements.

7. The transaction card of claim 1, wherein an arrangement of the tactile elements in the design configuration indicates an issuer of the transaction card.

8. The transaction card of claim 1, wherein an arrangement of the tactile elements in the design configuration indicates that the transaction card is a debit card, a credit card, or a rewards card.

9. A transaction card, comprising:
    a card body;
    a magnetic stripe connected to an outermost surface of the card body at a magnetic stripe region of the card body; and
    a tactile element in direct contact with an outermost surface of the magnetic stripe and raised relative to the outermost surface of the card body and the outermost surface of the magnetic stripe,
        wherein the tactile element comprises dual-state ink that is ultraviolet light-curable.

10. The transaction card of claim 9, wherein the tactile element is overlaid on the magnetic stripe.

11. The transaction card of claim 9, wherein the tactile element comprises additively-layered material.

12. The transaction card of claim 9, further comprising:
    an overlay layer disposed on the magnetic stripe,
        wherein the overlay layer comprises the tactile element.

13. The transaction card of claim 9, wherein the tactile element comprises a non-ferrous material.

14. The transaction card of claim 9, wherein the tactile element borders at least one edge of the magnetic stripe.

15. The transaction card of claim 9, wherein the tactile element is arranged in a fin-shaped configuration.

16. A method, comprising:
    obtaining information indicating a design configuration for a plurality of tactile elements to be applied at a magnetic stripe region of a card body of a transaction card; and
    applying the plurality of tactile elements directly on an outermost surface of a magnetic stripe at the magnetic stripe region of the card body in accordance with the design configuration,
        wherein applying the plurality of tactile elements comprises:
            depositing dual-state ink that is ultraviolet light-curable on the magnetic stripe, and
            exposing the dual-state ink to ultraviolet light, and
        wherein the plurality of tactile elements project from an outermost surface of the transaction card and the outermost surface of the magnetic stripe based on applying the plurality of tactile elements directly on the outermost surface of the magnetic stripe.

17. The method of claim 16, wherein applying the plurality of tactile elements the outermost surface of the magnetic stripe comprises:
    forming the plurality of tactile elements on the outermost surface of the magnetic stripe using additive printing.

18. The method of claim 16, wherein applying the plurality of tactile elements the outermost surface of the magnetic stripe comprises:
    applying an overlay layer on the outermost surface of the magnetic stripe,
        wherein the overlay layer comprises the tactile elements.

19. The method of claim 16, wherein the plurality of tactile elements are applied to overlay the magnetic stripe.

20. The method of claim 16, further comprising:
    receiving a digital image that depicts a two-dimensional representation of the design configuration for the plurality of tactile elements,
        wherein obtaining the information indicating the design configuration for the plurality of tactile elements comprises:
            generating the information indicating the design configuration for the plurality of tactile elements,
                wherein the information identifies a three-dimensional representation of the design configuration for the plurality of tactile elements based on the two-dimensional representation of the design configuration for the plurality of tactile elements.

* * * * *